(12) United States Patent
Takahashi (10) Patent No.: US 10,305,341 B2
(45) Date of Patent: May 28, 2019

(54) ELECTRIC MOTOR, PUMP DEVICE USING ELECTRIC MOTOR, AND STATOR

(71) Applicant: MIKUNI CORPORATION, Chiyoda-ku, Tokyo (JP)

(72) Inventor: Jun Takahashi, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 313 days.

(21) Appl. No.: 14/761,173

(22) PCT Filed: Dec. 10, 2013

(86) PCT No.: PCT/JP2013/083057
§ 371 (c)(1),
(2) Date: Jul. 15, 2015

(87) PCT Pub. No.: WO2014/112246
PCT Pub. Date: Jul. 24, 2014

(65) Prior Publication Data
US 2016/0020659 A1  Jan. 21, 2016

(30) Foreign Application Priority Data

Jan. 15, 2013  (JP) ................................. 2013-004623

(51) Int. Cl.
*H02K 3/28* (2006.01)
*H02K 3/34* (2006.01)
(Continued)

(52) U.S. Cl.
CPC ............... *H02K 3/48* (2013.01); *F04C 2/102* (2013.01); *F04C 14/08* (2013.01); *F04C 15/008* (2013.01);
(Continued)

(58) Field of Classification Search
CPC ............ H02K 3/48; H02K 1/146; H02K 3/28; H02K 3/345; H02K 3/522; F04C 2/102;
(Continued)

(56) References Cited

U.S. PATENT DOCUMENTS 6,166,468 A * 12/2000 Suzuki ................... H02K 1/148
310/216.061
6,177,751 B1 * 1/2001 Suzuki ................... H02K 1/148
310/194
(Continued)

FOREIGN PATENT DOCUMENTS

GB      2362268 A    11/2001
JP   2004088944 A     3/2004
(Continued)

OTHER PUBLICATIONS

English translation of JP 2004088944; Mar. 2004; Akiyoshi et al.*
(Continued)

*Primary Examiner* — Bernard Rojas
*Assistant Examiner* — Ahmed Elnakib
(74) *Attorney, Agent, or Firm* — Cantor Colburn LLP (57) ABSTRACT

An electric motor, and the electric motor includes a stator core provided on a stator, a plurality of teeth provided on the stator core, a coil wound body attached to the tooth, an inner flange portion provided at an inner diameter side of a bobbin, a first engagement portion provided at one end side in a width direction of the inner flange portion, and a second engagement portion provided at the other end side in the width direction of the inner flange portion, the first engagement portion being provided to be located at an outer side in a diameter direction than the second engagement portion of the adjacent coil wound body in a moving direction, the second engagement portion being provided to be located at an outer side in a diameter direction than the first engagement portion of the adjacent coil wound body in a moving direction.

7 Claims, 8 Drawing Sheets

(51) Int. Cl.
*H02K 3/48* (2006.01)
*F04C 14/08* (2006.01)
*F04C 15/00* (2006.01)
*F04C 18/10* (2006.01)
*F04C 2/10* (2006.01)
*F04C 28/08* (2006.01)
*F04C 29/00* (2006.01)
*H02K 1/14* (2006.01)
*H02K 3/52* (2006.01)

(52) U.S. Cl.
CPC .............. *F04C 18/10* (2013.01); *F04C 28/08* (2013.01); *F04C 29/0085* (2013.01); *H02K 1/146* (2013.01); *H02K 3/28* (2013.01); *H02K 3/345* (2013.01); *H02K 3/522* (2013.01)

(58) Field of Classification Search
CPC ........ F04C 14/08; F04C 15/008; F04C 18/10; F04C 28/08; F04C 29/0085
USPC .............................. 310/85–88, 180, 214, 215
See application file for complete search history.

(56) References Cited

U.S. PATENT DOCUMENTS

| | | | | |
|---|---|---|---|---|
| 6,538,353 B2* | 3/2003 | Marioni | ................ | H02K 1/148 310/86 |
| 8,102,093 B2 | 1/2012 | Prudham | | |
| 2002/0158545 A1* | 10/2002 | Marioni | ................ | H02K 1/148 310/261.1 |
| 2003/0001445 A1* | 1/2003 | Paden | ................ | F16C 32/0442 310/90.5 |
| 2015/0354563 A1* | 12/2015 | Takahashi | .............. | H02K 3/522 417/410.4 |
| 2016/0020659 A1* | 1/2016 | Takahashi | .............. | H02K 1/146 417/410.4 |
| 2018/0163721 A1* | 6/2018 | Takahashi | .............. | F04B 53/00 |

FOREIGN PATENT DOCUMENTS

| | | |
|---|---|---|
| JP | 2005323477 A | 11/2005 |
| JP | 2009532010 A | 9/2009 |
| JP | 2011114902 A | 6/2011 |
| JP | 2011217448 A | 10/2011 |

OTHER PUBLICATIONS

English translation of Sasaki et al. (JP 2011-114902); Jun. 2011.*
International Search Report corresponding to Application No. PCT/JP2013/083057; dated Mar. 4, 2014, with English translation.
Expended European Search Report corresponding to Application No. 13871968.7-1504/2947754 PCT/JP2013083057; dated Oct. 10, 2016.

* cited by examiner

ELECTRIC MOTOR, PUMP DEVICE USING ELECTRIC MOTOR, AND STATOR

CROSS REFERENCE TO RELATED APPLICATIONS

This is a U.S. national stage of application No. PCT/JP2013/083057, filed on Dec. 10, 2013. Priority under 35 U.S.C. § 119(a) and 35 U.S.C. § 365(b) is claimed from Japanese Patent Applications No. 2013-004623 filed on Jan. 15, 2013, the disclosure of which is also incorporated herein by reference.

TECHNICAL FIELD

The present invention relates to an electric motor, a pump device using the electric motor, and a stator.

BACKGROUND ART

In a vehicle such as an automobile and the like, for example, a pump device using oil is used in order to cool a driving portion such as an engine and a motor (a driving motor, an electric generation motor). Such pump devices include, for example, a pump device driven by an electric motor as disclosed in PTL 1. In the configuration disclosed in such PTL 1, a method used in a case where a coil is attached to a stator of an electric motor includes winding a winding wire around a winding frame portion of a bobbin, and attaching the bobbin around which the winding wire of the coil has been wound (coil wound body) to a main pole tooth of the stator.

CITATION LIST

Patent Literature

{PTL 1}
Japanese National Phase Application of PCT Application No. 2009-532010

SUMMARY OF INVENTION

Technical Problem

However, the following problem occurs when the bobbin around which the winding wire has been wound (coil wound body) is attached to the main pole tooth and thereafter, the resin is further injected into the inside of the mold, and the coil wound body is fixed to the stator by the solidification of the resin. More specifically, when the stator having the coil wound body attached thereto is set in the mold, and injection molding is performed, a positional deviation may occur with respect to the stator of the coil wound body, and in such case, there is a problem in that it cannot be set in the mold or the injection molding cannot be performed. Even if the injection molding is performed with the positional deviation, and a stator module including the stator is formed, the formed stator module becomes defective.

Figure 9:
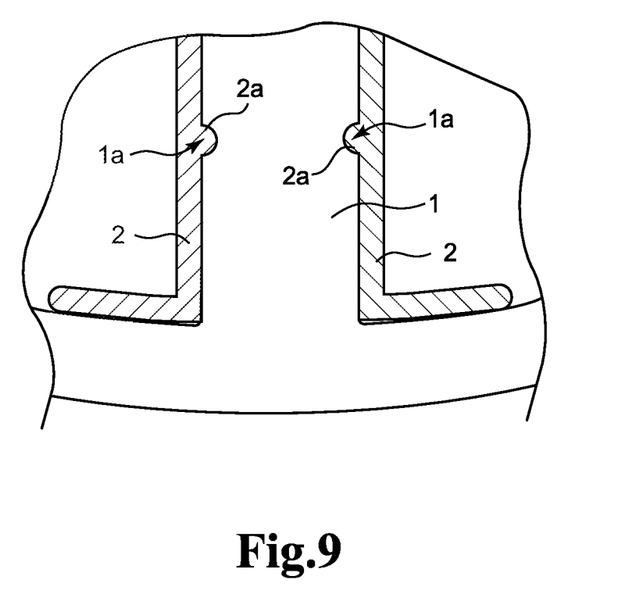
FIG. 9 is a top view illustrating a state in which a protruding portion of a bobbin engages with a depression portion of a main pole tooth.

However, the coil wound body is likely to positionally deviate from the main pole tooth. In order to prevent the positional deviation of the coil wound body, it may be possible to provide depression portions 1a on the main pole tooth 1 as shown in FIG. 9, and protrusions 2a corresponding to the depression portions 1a may be provided on the bobbin 2. However in such case, the width of the main pole tooth 1 is reduced for the amount of the depression portion 1a, and this narrows the magnetic path, and is likely to cause magnetic saturation. In order to prevent this, it is necessary to widen the width of the main pole tooth 1, but the weight of the stator core may increase because of this, or in some cases, it is impossible to widen the width of the main pole tooth because of the limitation in terms of the sizes and the like.

It may be possible to provide a protruding portion on the main pole tooth 1 and provide a depression portion on the bobbin 2, which is a pattern having depressions/projections opposite to the configuration as shown in FIG. 9. However, in general, the bobbin 2 is a member for electrical insulation, and the thickness thereof is thin, and therefore, it is difficult to further provide a depression portion on the bobbin 2.

The present invention is made in view of the above circumstances, and it is an object of the present invention to provide an electric motor, a pump device using the electric motor, and a stator capable of preventing a coil wound body from positionally deviating from a stator core.

Solution to Problem

In order to solve the above problem, according to a first aspect of the present invention, an electric motor which includes a rotor having a magnetic pole and a stator for arranging the rotor in a central hole is provided, and the electric motor includes a stator core provided on the stator and formed of a magnetic material, a plurality of teeth provided on the stator core, a coil wound body attached to the tooth, and having a bobbin and a coil formed by winding a conductive wire around the bobbin, an inner flange portion provided at an inner diameter side of the bobbin, a first engagement portion provided at one end side in a width direction of the inner flange portion, and a second engagement portion provided at the other end side in the width direction of the inner flange portion, and coming into contact with the first engagement portion of the adjacent coil wound body, where an acuminate portion of the first engagement portion of a first coil wound body is provided to be located at an outer diameter side than a side end portion of a protruding portion of a second engagement portion of a second coil wound body, which is adjacent to the first engagement portion of the coil first wound body, in a first moving direction along a length extension direction of the tooth of the first coil wound body, and a side end portion of a protruding portion of the second engagement portion of the first coil wound body is provided to be located at an outer diameter side than an acuminate portion of the first engagement portion of a third coil wound body, which is adjacent to the second engagement portion of the first coil wound body, in the first moving direction where the side end portions are taken along a direction perpendicular to the first moving direction of the first coil wound body.

According to another aspect of the present invention, in the above invention, the acuminate portion latches at a contact portion for coming into contact with the second engagement portion of the adjacent coil wound body.

Further, according to another aspect of the present invention, in the above invention, the first engagement portion and the second engagement portion are preferably provided with a tapered portion in parallel with the moving direction of each of the adjacent coil wound bodies.

According to another aspect of the present invention, in the above invention, a curved portion formed in a curved shape is preferably provided at the end portion side of the width direction of the protruding portion.

Further, according to another aspect of the present invention, in the above invention, all of the bobbins respectively attached to the plurality of teeth are preferably provided in a same shape, and the inner flange portion elastically preferably deforms to a degree that the coil wound body is allowed to move along the moving direction, when the first engagement portion and the second engagement portion existing in the inner flange portion collide with the second engagement portion and the first engagement portion, respectively, of the adjacent coil wound bodies upon moving from an inner diameter side to an outer diameter side in the diameter direction along a moving direction of the tooth of the coil wound body where the inner flange portion exists.

According to another aspect of the present invention, in the above invention, the first engagement portion and the second engagement portion are provided to protrude from the stator core in an axial direction along a rotation axis of the rotor.

Further, another aspect of the present invention, in the above invention, the first engagement portion and the second engagement portion are provided at a side of coil end which protrudes from an end surface of the stator, and are provided inside of a space enclosed by the plurality of coil ends.

According to an invention of a pump device of the present invention, the pump device preferably includes the electric motor according to each of the above inventions, and a pump unit having a periodic motion unit that makes a periodic motion by an activation of the electric motor, and configured to take and discharge a fluid according to the motion of the periodic motion unit.

Further, according to another aspect of the present invention, a stator for an electric motor is provided, and the stator includes a stator core formed of a magnetic material, a plurality of teeth provided on the stator core, a coil wound body attached to the tooth, and having a bobbin and a coil formed by winding a conductive wire around the bobbin, an inner flange portion provided at an inner diameter side of the bobbin, a first engagement portion provided at one end side in a width direction of the inner flange portion, and a second engagement portion provided at the other end side in the width direction of the inner flange portion, and coming into contact with the first engagement portion of the adjacent coil wound body, where an acuminate portion of the first engagement portion of a first coil wound body is provided to be located at an outer diameter side than a side end portion of a protruding portion of a second engagement portion of a second coil wound body, which is adjacent to the first engagement portion of the first coil wound body, in a first moving direction along a length extension direction of the tooth of the first coil wound body, and a side end portion of a protruding portion of the second engagement portion of the first coil wound body is provided to be located at an outer diameter side than an acuminate portion of the first engagement portion of a third coil wound body, which is adjacent to the second engagement portion of the first coil wound body, in the first moving direction where the side end portions are taken along a direction perpendicular to the first moving direction of the first coil wound body.

Advantageous Effects of Invention

According to the present invention, a coil wound body can be prevented from positionally deviated from a stator core.

DESCRIPTION OF EMBODIMENTS

Hereinafter, an electric motor 30 and a pump device 10 using the electric motor 30 according to an embodiment of the present invention will be explained with reference to drawings. In the following explanation, the axial direction of an inner shaft 31 is denoted as an X direction, a side of a cover body 160 of the inner shaft 31 is denoted as X1, and a side of a pump cover 24 is denoted as X2.

1. Regarding Configuration of Electric Motor 30 and Pump Device 10 Using Electric Motor 30

Figure 1:
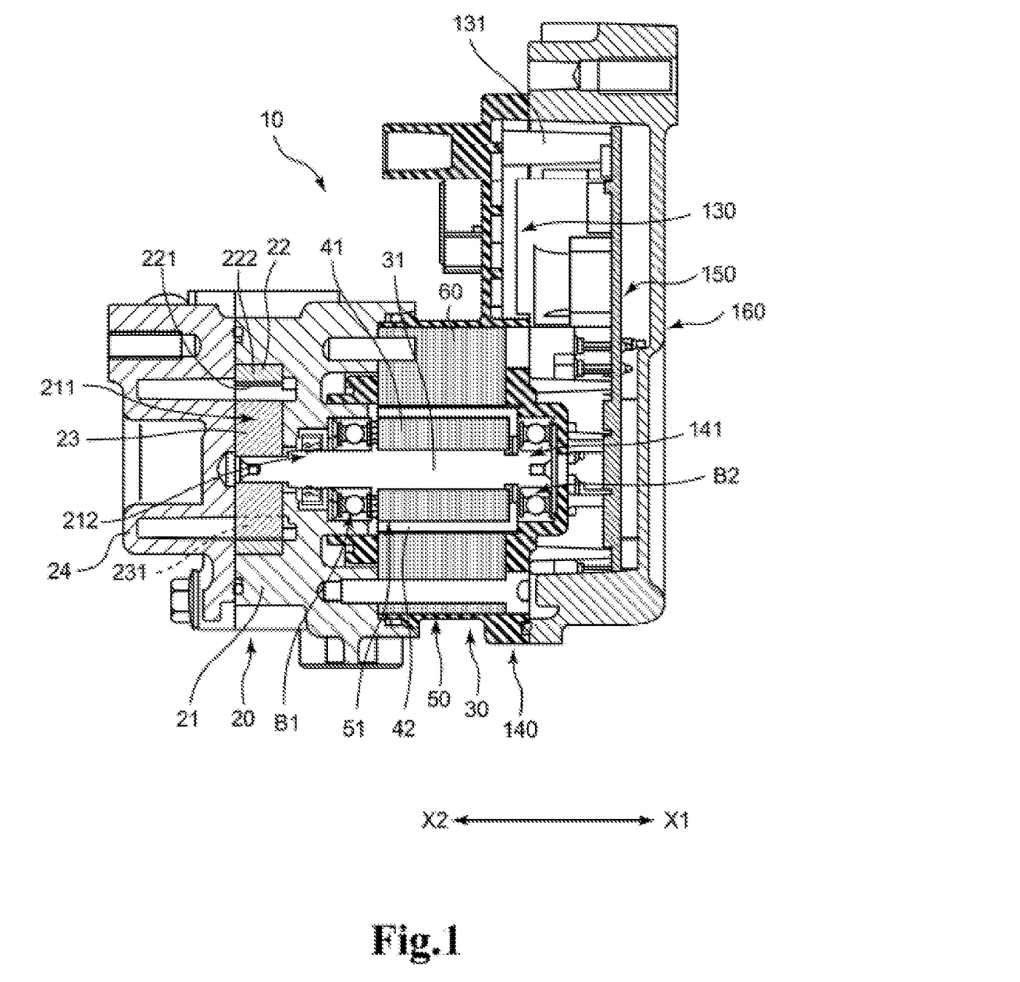
FIG. 1 is a side surface cross sectional view illustrating a configuration of a pump device according to an embodiment of the present invention.

FIG. 1 is a cross sectional view illustrating a configuration of the pump device 10 using the electric motor 30. The pump device 10 includes a pump unit 20 and an electric motor 30. In the present embodiment, the pump unit 20 is a trochoid pump (internal gear pump). The pump unit 20 includes a pump main body 21, and the pump main body 21 includes a depression portion 211 for disposing an outer rotor 22 and an inner rotor 23. The depression portion 211 extends from the end surface at the side of X2 of the pump main body 21 to the side of X1, and is formed to be depressed for a depth deep enough to accommodate the outer rotor 22 and the inner rotor 23, and the shape thereof in plan view is of the size corresponding to the outer rotor 22.

Further, the pump cover 24 is attached to the side of X2 of the pump main body 21, and accordingly the depression portion 211 is covered with the pump cover 24.

The outer rotor 22 is rotatably disposed in the depression portion 211. However, the rotation center of the outer rotor 22 is decentered with respect to the rotation center of the inner rotor 23 and the inner shaft 31. As is well known, the outer rotor 22 includes an inner peripheral depression portion 221 at the inner peripheral side, and the inner wall surface of the inner peripheral depression portion 221 serves as an internal gear 222. The inner rotor 23 is disposed in the inner peripheral depression portion 221, but the external gear 231 that comes into contact with or moves away from the internal gear 222 is provided on the external peripheral wall surface of the inner rotor 23. The internal gear 222 and the external gear 231 are formed by a trochoid curved line. A hole portion into which the inner shaft 31 is inserted is disposed in the rotation center of the inner rotor 23, but the hole portion is provided to be able to engage with the inner shaft 31.

In this case, the pump device 10 is not limited to the trochoid pump explained above, and may use various kinds of pumps such as an external gear pump, a vane pump, a vortex pump, a cascade pump, a piston pump and the like.

As shown in FIG. 1, a penetration hole 212 is provided in the pump main body 21, and the inner shaft 31 is inserted into the penetration hole 212. The inner shaft 31 is rotatably supported by the pump main body 21 via the shaft bearing B1. The other end side of the inner shaft 31 (the end portion side at the side of X1) is rotatably supported by a shaft bearing B2 attached to the depression fitting portion 141 of the stator module 140 explained later. The inner shaft 31 corresponds to a rotation axis.

Figure 2:
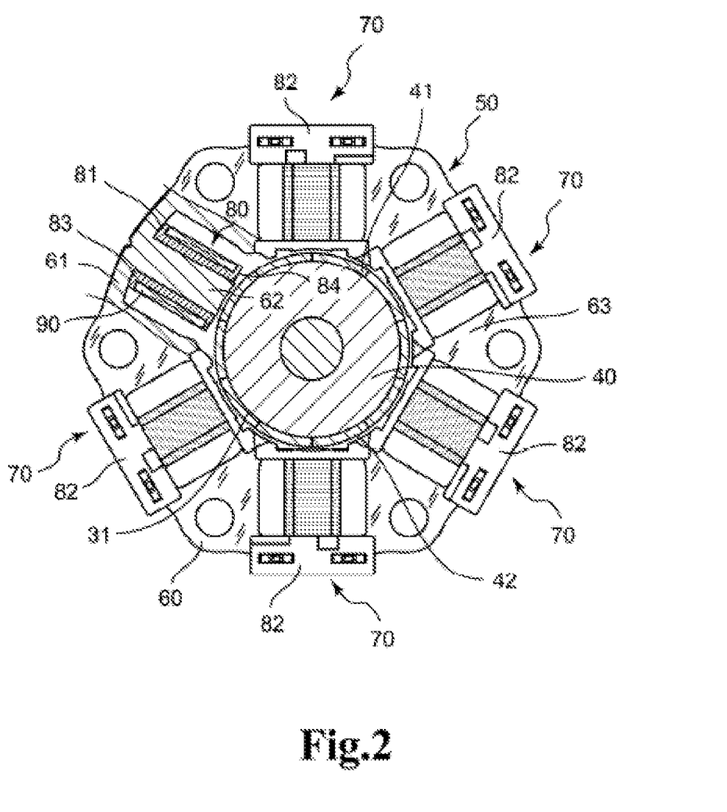
FIG. 2 is a top view illustrating a configuration of the electric motor of FIG. 1, and is also a figure illustrating a partial top surface cross section.

Subsequently, a configuration of the electric motor 30 will be explained. FIG. 2 is a top view illustrating the configuration of the electric motor 30, but also illustrates a partial cross section. The electric motor 30 includes an inner shaft 31 common to the pump unit 20, and a rotor 40 is provided at the external peripheral side of the inner shaft 31. In the configuration as shown in FIG. 2, the rotor 40 includes a yoke 41 and a magnet 42. The yoke 41 is attached to the external peripheral side of the inner shaft 31, and for example, the yoke 41 is formed by stacking and molding process after pressing of an electromagnetic steel sheet such as a silicon steel sheet having an electrical insulating coating film on its surface. However, the yoke 41 may be formed using any kind of magnetic material such as, e.g., ferrite and dust core. Alternatively, a configuration not using any yoke 41 may also be employed.

The magnet 42 is attached to the external peripheral side of the yoke 41. The magnet 42 is attached to the external peripheral side of the yoke 41 in such a state that the magnetic pole changes with every predetermined angle. The rotor 40 of the electric motor 30 is constituted by the yoke 41 and the magnet 42 as explained above, but it is to be understood that other members (for example, the inner shaft 31) may also be included in the rotor 40. As explained later, when there are six coils on the stator 50, the same number of south poles and north poles are provided on the external peripheral side of the rotor 40. In FIG. 2, for example, 10 pieces (10 poles) are provided, but any number of poles may be provided in a combination limited in association with the number of teeth and the number of excitation phases of the coil. The magnet 42 may be, for example, a ferrite magnet, a neodymium magnet, a samarium-cobalt magnet, and an alnico magnet, or may use any kind of material. The rotor configuration may be such that, inside of the yoke 41, holes disposed equally according to the number of poles are provided, and the magnets are inserted thereto.

At the external peripheral side of the rotor 40, the stator 50 is disposed in such a state that the stator 50 faces the external peripheral side of the rotor 40 as shown in FIG. 2. More specifically, the rotor 40 is located in the central hole 51 of the stator 50. This stator 50 includes a stator core 60 and a coil wound body 70. For example, the stator core 60 is formed by stacking and molding process after pressing of an electromagnetic steel sheet such as a silicon steel sheet having an electrical insulating coating film on its surface. However, the stator core 60 may be formed using any kind of magnetic material other than electromagnetic steel plates, such as, e.g., ferrite and dust core.

In the stator core 60, an external peripheral ring portion 61, a main pole tooth 62, and a commutating pole tooth 63 are integrally provided. However, each portion constituting the stator core 60 may not be configured integrally. For example, the commutating pole tooth 63 may not be integrated with the main pole tooth 62, and separate configuration may also be employed. Alternatively, the stator core 60 may employ a configuration that is not provided with the commutating pole tooth 63. The external peripheral ring portion 61 is a ring-shaped portion of the stator core 60 that is located at the external peripheral side. The main pole tooth 62 is a portion protruding from the external peripheral ring portion 61 toward the inside in the diameter direction. In the present embodiment, the main pole tooth 62 is provided in a rectangular shape, and the coil wound body 70 explained later can be passed therethrough. The main pole teeth 62 are provided in the peripheral direction with every 60 degrees interval. It should be noted that the main pole tooth 62 corresponds to a tooth. However, in a case where the coil wound body 70 is attached to a portion other than the main pole tooth 62 (for example, the commutating pole tooth 63 and the like) in the stator core 60, the portion to which it is attached may be considered to correspond to the tooth.

Between adjacent main pole teeth 62, a commutating pole tooth 63 is provided. The commutating pole tooth 63 is provided between the adjacent main pole teeth 62, and the existence of the commutating pole tooth 63 reduces cogging during operation. In the present embodiment, the width of the main pole teeth 62 does not become narrower toward the center, and therefore, the width of the commutating pole tooth 63 is provided to become narrower from the external peripheral side toward the center side.

2. Regarding Coil Wound Body 70

Figure 3:
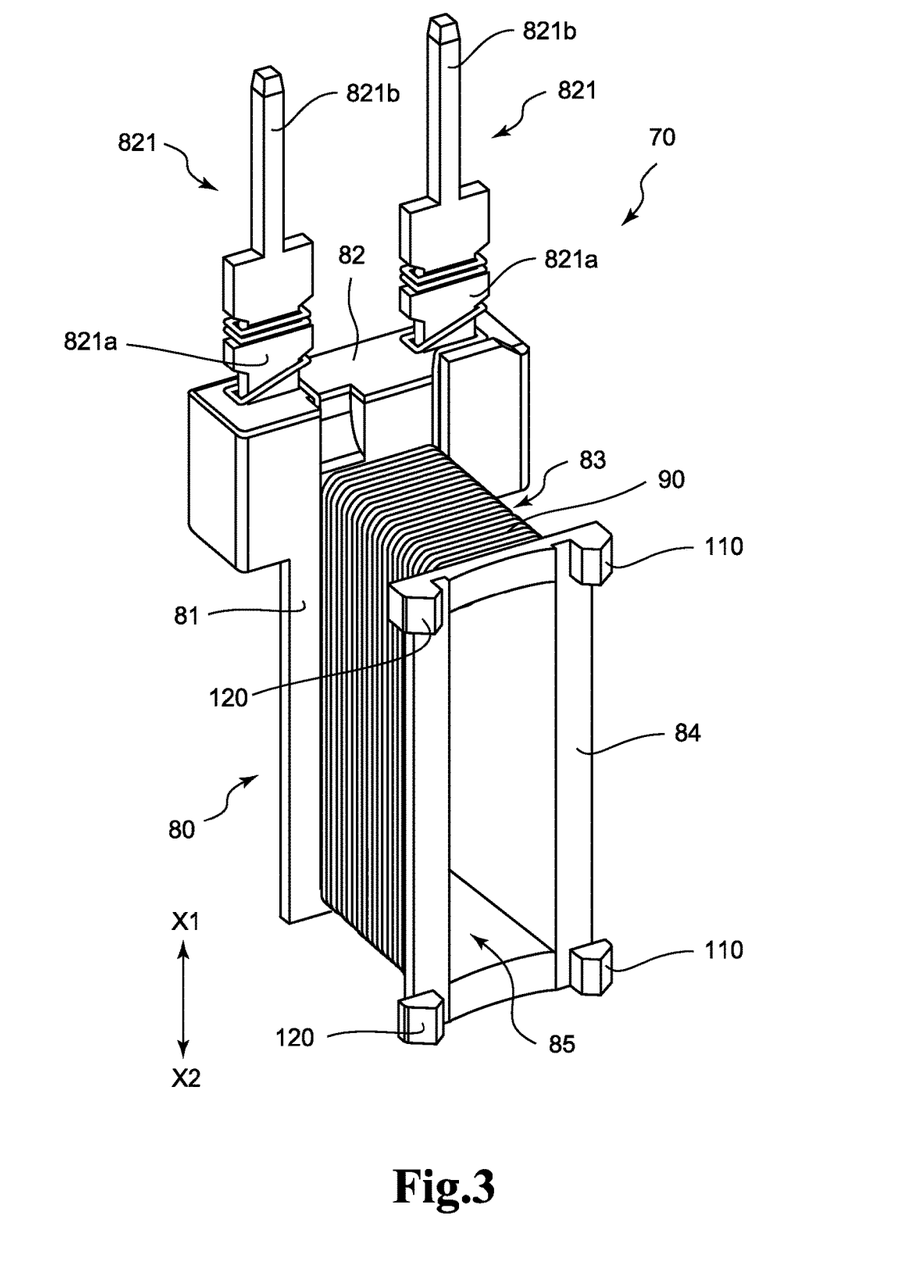
FIG. 3 is a perspective view illustrating a configuration of a coil wound body of the electric motor of FIG. 1.
Figure 4:
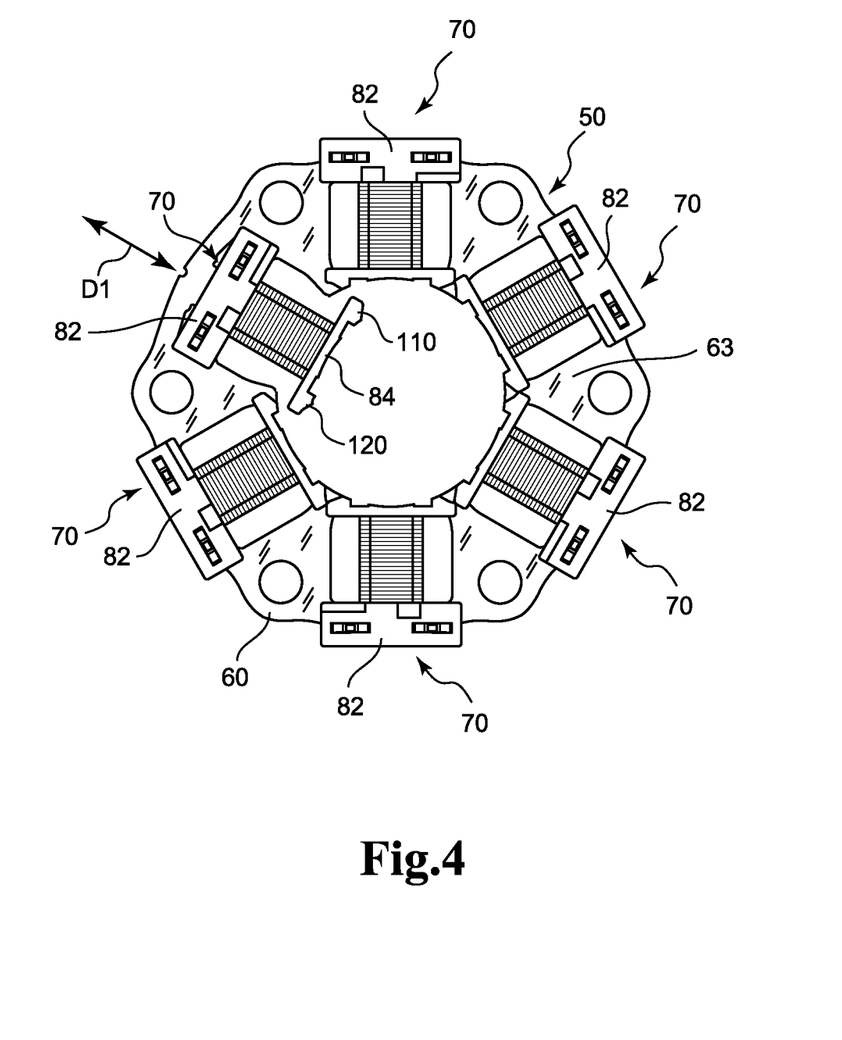
FIG. 4 is a top view illustrating a state of an intermediate step in which five of the six coil wound bodies have already been attached to the main pole teeth while a coil wound body is in the process of being attached to the main pole tooth.

FIG. 3 is a perspective view illustrating a configuration of the coil wound body 70. The coil wound body 70 as shown in FIG. 3 is attached to the main pole tooth 62. An image of attachment of such coil wound body 70 is shown in FIG. 4. FIG. 4 is a top view illustrating a state of an intermediate step in which five of the six coil wound bodies 70 have already been attached to the main pole teeth 62 while a coil wound body 70 is in the process of being attached to the main pole tooth 62.

As shown in FIG. 3, the coil wound body 70 includes a bobbin 80 and a coil 90. The coil 90 is configured by winding a conductive wire around the bobbin 80. In this case, the coil 90 is formed by winding a conductive wire around the bobbin 80 which is a different body from the stator core 60, and therefore, the formation of the coil 90 can be made outside of the stator core 60. Therefore, the conductive wire can be wound densely, and this can improve the space factor. It should be noted that a square wire may be used instead of a round wire in order to improve the space factor.

3. Regarding Bobbin 80

Subsequently, the bobbin 80 will be explained. The bobbin 80 is formed using a resin as a material, and the bobbin 80 includes an outer flange portion 81, a terminal base portion 82, a winding frame portion 83, and an inner flange portion 84. The bobbin 80 is provided with an insertion hole 85 penetrating from the outer flange portion 81 to the inner flange portion 84. The main pole tooth 62 explained above is inserted into the insertion hole 85.

The outer flange portion 81 is a portion located at the outer diameter side when attached to the main pole tooth 62, and is provided to have a wider width than the winding frame portion 83. The external peripheral side of the outer flange portion 81 comes into contact with the inner wall of the external peripheral ring portion 61, and accordingly, the positioning is achieved at the outer diameter side of the coil wound body 70 (see FIG. 2). The terminal base portion 82 is a portion protruding from an end portion at X1 side of the outer flange portion 81 to the outer diameter side and X1 side. Of this terminal base 82, a portion at the outer side (X1 side) with respect to the coil 90 corresponds to a coil end side. However, as long as a portion is at the outer side (X1 side) than the stator 50, it may be included in the concept of the coil end side even if it is a portion where the coil 90 exists. In the present embodiment, a first engagement portion 110 and a second engagement portion 120 explained later exist at the inside of a space enclosed by multiple coil ends (space at the inner peripheral side).

A connection terminal 821 is integrally attached to this terminal base portion 82. The connection terminal 821 is made of a material having conductivity (metal and the like). The connection terminal 821 is provided with a binding portion 821a and a pin portion 821b, and among them, the binding portion 821a is bound with the end of the conductive wire which forms the coil 90, and is electrically connected to the conductive wire by soldering and the like. The pin portion 821b is a pin-shaped portion protruding to the X1 side than the binding portion 821a, and is inserted into a pin hole of a circuit substrate explained later.

The winding frame portion 83 is a portion located between the outer flange portion 81 and the inner flange portion 84, and is a portion where the conductive wire is wound and the coil 90 is formed. In the winding frame portion 83, the positioning can be achieved when this conductive wire is wound. The inner flange portion 84 is a portion of the bobbin 80 that is located closest to the inner diameter side. Like the outer flange portion 81, this inner flange portion 84 is provided to have a wider width than the winding frame portion 83.

4. Regarding Engagement Portions 110, 120

Subsequently, the engagement portions 110, 120 provided on the inner flange portion 84 will be explained. In the explanation about the engagement portions 110, 120, a case where the engagement portions 110, 120 move will also be explained.

As shown in FIG. 3, the inner flange portion 84 is provided with the engagement portions 110, 120. A pair of engagement portions 110, 120 is provided on each of the end portion of the X1 side and the end portion of the X2 side in FIG. 1 (the upper side and the lower side in FIG. 3). In addition, each of the first engagement portion 110 and the second engagement portion 120 is provided at the outer side (X1 side and X2 side) with respect to the stator 50 to the axial direction of the rotor 40 (inner shaft 31). The engagement portions 110, 120 are provided in different shapes at one end side and the other end side in the width direction of the inner flange portion 84. In the following explanation, the engagement portion of the one end side of the inner flange portion 84 (right side in FIG. 3) is denoted as the first engagement portion 110, and the engagement portion of the other end side of the inner flange portion 84 (left side in FIG. 3) is denoted as the second engagement portion 120, but when it is not necessary to distinguish between them, they will be referred to as engagement portions 110, 120.

Figure 5A:
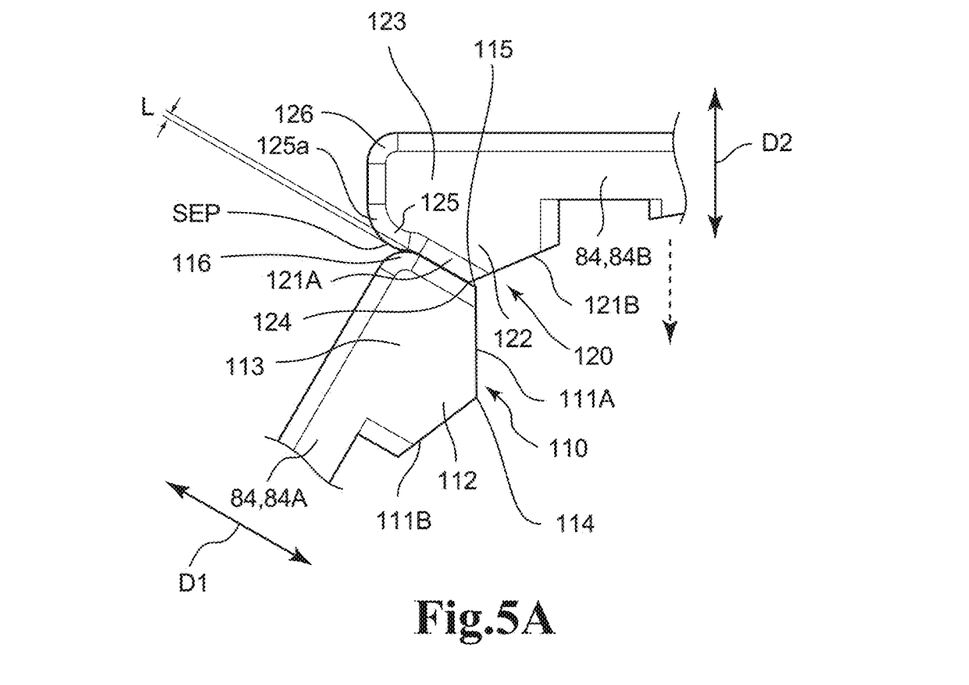
FIG. 5A is a partial top view illustrating an image of the intermediate step for moving and attaching the first engagement portion to the second engagement portion that is not moving.
Figure 5B:
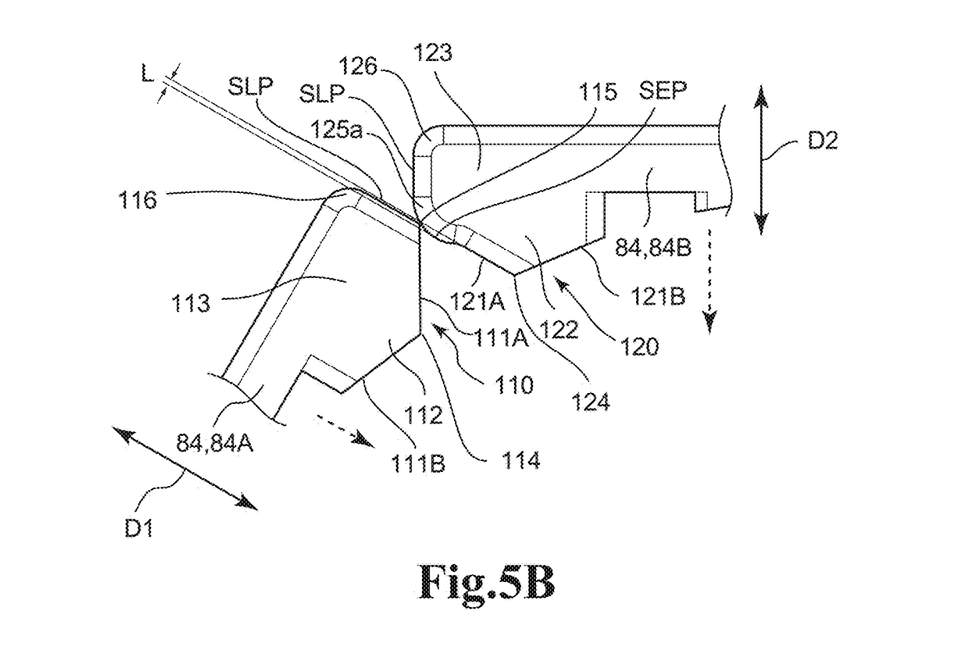
FIG. 5B is a top view illustrating the state after the attachment has been done.
Figure 6A:
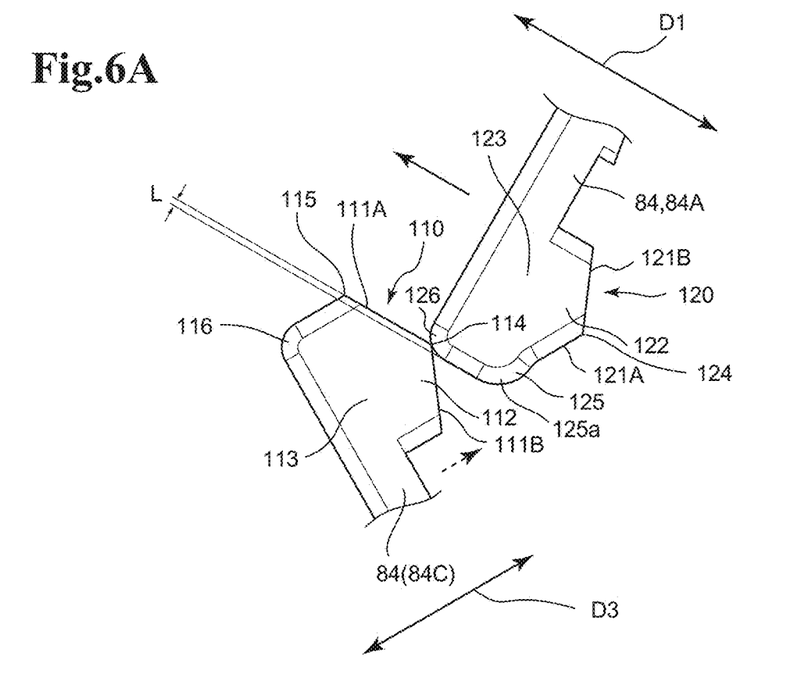
FIG. 6A is a partial top view illustrating an image of the intermediate step for moving and attaching the second engagement portion to the first engagement portion that is not moving.
Figure 6B:
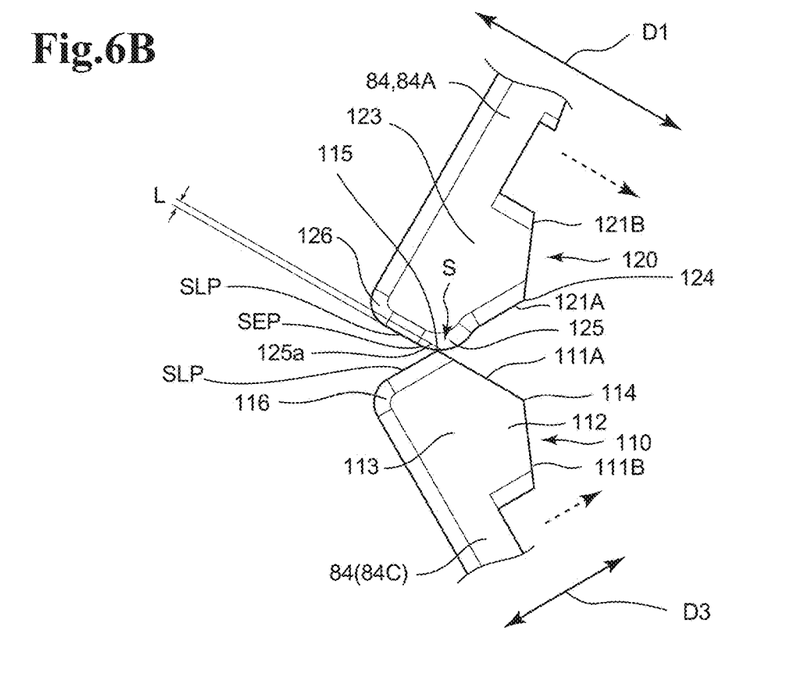
FIG. 6B is a top view illustrating the state after the attachment has been done.

FIGS. 5 and 6 are top views illustrating the state where the first engagement portion 110 and the second engagement portion 120 are enlarged. Any of these FIGS. 5A to 6B is a figure illustrating the state around the coil wound body 70 in the intermediate step of attachment to the main pole tooth 62 as shown in FIG. 4. It should be noted that FIG. 5A is a partial top view illustrating an image of the intermediate step for moving and attaching, in a direction line D1, the first engagement portion 110 to the second engagement portion 120 (having been attached) that is not moving, and FIG. 5B is a top view illustrating the state after the attachment has been done. FIG. 6A is a partial top view illustrating an image of the intermediate step for moving and attaching, in a direction line D2, the second engagement portion 120 to the first engagement portion 110 (having been attached) that is not moving, and FIG. 6B is a top view illustrating the state after the attachment has been done.

In FIGS. 5A to 6B, totally three inner flange portions 84 are shown. Any one of them (shown in both of FIGS. 5A to 6B) is referred to as an inner flange portion 84A, another thereof (shown only in FIGS. 5A and 5B) will be referred to as an inner flange portion 84B, and still another thereof (shown only in FIGS. 6A and 6B) will be referred to as an inner flange portion 84C.

Both of the first engagement portion 110 and the second engagement portion 120 are provided to protrude from the inner flange portion 84 in a direction away from the winding frame portion 83. When the coil wound body 70 is attached to the main pole tooth 62 as shown in FIG. 4, the first engagement portion 110 and the second engagement portion 120 are located at the inner diameter side of the inner flange portion 84. The first engagement portion 110 and the second engagement portion 120 are provided to protrude in the width direction of the inner flange portion 84 of another portion of the inner flange portion 84.

As shown in FIG. 3, the first engagement portion 110 is protruding in a direction away from the inner flange portion 84. As shown in FIGS. 5A to 6B, the first engagement portion 110 includes two tapered portions 111, and the two tapered portions 111 are provided to draw a V shape of which crossing portion of each other is an obtuse angle. Of the two tapered portions 111, an end portion most close to the inner flange portion 84 is provided at a position away from the end surface of the inner flange portion 84. More specifically, the first engagement portion 110 is provided with a rectangular shaped portion 112 of which external peripheral surfaces have the two tapered portions 111 and a base portion 113 of which external peripheral surface is substantially perpendicular to the inner flange portion 84. However, the first engagement portion 110 may also employ a configuration not having any base portion 113.

In the following explanation, of the two tapered portions 111, the tapered portion 111 located at the end portion in the width direction of the inner flange portion 84 will be referred to as a first tapered portion 111A, and the tapered portion 111 close to the center side in the width direction of the inner flange portion 84 will be referred to as a second tapered portion 111B, but when it is not necessary to distinguish between them, they will be simply referred to as tapered portions 111. It should be noted that the first tapered portion 111A is provided to be parallel to the moving direction of the adjacent coil wound body 70, and this first tapered portion 111A corresponds to a parallel tapered portion.

As shown in FIGS. 5A to 6B, a portion where the two tapered portions 111 cross each other is provided to form an acuminate shape. In the explanation below, the portion of this acuminate shape will be referred to as a vertex portion 114. The end portion at the outer side of the first tapered portion 111A (the end portion at the side not crossing the second tapered portion 111B) and the external peripheral surface of the base portion 113 are provided to form an acuminate shape. Hereinafter, the portion of this acuminate shape will be referred to as an acuminate portion 115. This acuminate portion 115 is a portion that latches a protruding portion 125 explained later.

Like the first engagement portion 110, the second engagement portion 120 also has a first tapered portion 121A at the end portion in the width direction of the inner flange portion 84, and, in the second engagement portion 120, there is a second tapered portion 121B at the side closer to the center side of the width direction of the inner flange portion 84. In this case, when it is not necessary to distinguish between the first tapered portion 121A and the second tapered portion 121B, the first tapered portion 121A and the second tapered portion 121B will be simply referred to as tapered portions 121. Like the first engagement portion 110, the second engagement portion 120 is provided with a rectangular shaped portion 122, a base portion 123, and a vertex portion 124. It should be noted that the first tapered portion 121A is provided to be parallel to the moving direction of the adjacent coil wound body 70, and this first tapered portion 121A corresponds to a parallel tapered portion.

As shown in FIGS. 5A to 6B, the schematic shape of the second engagement portion 120 is also similar to the first engagement portion 110. However, in the second engagement portion 120, the shape around the first tapered portion 121A is different from the shape around the first tapered portion 111A of the first engagement portion 110. This will be explained in details. The first tapered portion 121A is provided with a protruding portion 125 that protrudes more greatly than the other portions of the first tapered portion 121A. As shown in FIGS. 6A and 6B, the portion of the protruding portion 125 that is most protruding is protruding by a size L from the other portions of the first tapered portion 121A. The end portion of the outer side of the protruding portion 125 (the end portion at the side not crossing the second tapered portion 121B) is in a curved shape. In the explanation below, a portion in a curved shape at the end portion side of the first tapered portion 121A will be referred to as a curved portion 125a. The first and second engagement portions 110 and 120 may be provided with sliding portions SLP which are parallel to the moving direction of the first and second engagement portions 110 and 120, respectively.

In a case where the coil wound body 70 is attached to each main pole tooth 62 as shown in FIGS. 5A to 6B, the acuminate portion 115 existing on the adjacent inner flange portion 84 is disposed to collide with (latch) the curved portion 125a of the second engagement portion 120. Totally six sets of collisions (latches) of the acuminate portion 115 and the protruding portion 125 having the curved portion 125a are formed as shown in FIGS. 5A to 6B. More specifically, when there are six main pole teeth 62, six sets exist, which is as many as the number of the main pole teeth 62.

Figure 7:
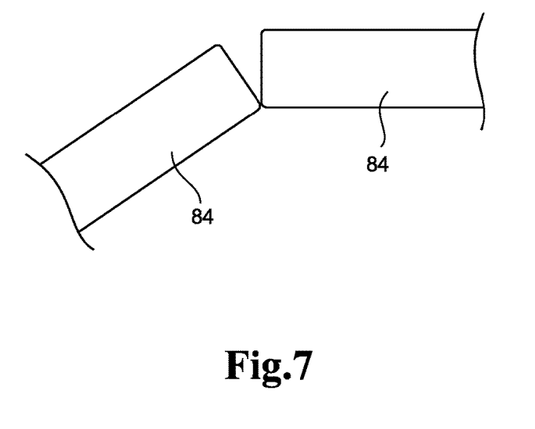
FIG. 7 is a top view illustrating a contact state at the end portion side of the inner flange portion in a case where the first engagement portion and the second engagement portion are not provided

The first engagement portion 110 and the second engagement portion 120 explained above have the following features. This feature will be explained while it is compared with a case where the first engagement portion 110 and the second engagement portion 120 are not provided. FIG. 7 is a top view illustrating a contact state at the end portion side of the inner flange portion 84 in a case where the first engagement portion 110 and the second engagement portion 120 are not provided. In the configuration as shown in FIG. 7, one end portion and the other end portion of the inner flange portions 84 are in a symmetrical shape. For this reason, the contact portion therebetween is not in a positional relationship in which one of them is located in front and the other of them is located at the back. Therefore, they are brought into pressurized contact with each other at the contact portion, but the coil wound body 70 is in such state that the coil wound body 70 can be easily detached from the main pole tooth 62.

In contrast, in the configuration as shown in FIGS. 5A to 6B, the first engagement portion 110 and the second engagement portion 120 are provided in an asymmetrical shape. In a state after the coil wound body 70 as shown in FIG. 5B has been attached, the acuminate portion 115 of the first engagement portion 110 of the inner flange portion 84A is arranged to be located behind (the outer moving side) than a side end portion SEP (a vertex) of the protruding portion 125 of the second engagement portion 120 of the inner flange portion 84B, taken along a direction perpendicular to the direction line D1, in the direction along the direction line D1 for insertion of the coil wound body 70 where the inner flange portion 84A exists. Further, the protruding portion 125 of the inner flange portion 84B is arranged to be located at the front side (the inner moving side) than the acuminate portion 115 of the first engagement portion 110 of the inner flange portion 84A in the direction along the direction line D2 for insertion of the coil wound body 70 where the inner flange portion 84B exists.

In a state after the coil wound body 70 as shown in FIG. 6B has been attached, in an area S, a side end portion SEP of the protruding portion 125 of the second engagement portion 120 of the inner flange portion 84A, taken along a direction perpendicular to the direction line D1, is arranged to be located behind (the outer moving side) than the acuminate portion 115 of the first engagement portion 110 of the inner flange portion 84C in the direction along the direction line D1 for insertion of the coil winding wire 70 where the inner flange portion 84A exists. Further, the acuminate portion 115 of the first engagement portion 110 of the inner flange portion 84C is arranged to be located behind (the outer moving side) than a side end portion SEP of the protruding portion 125 of the second engagement portion 120 of the inner flange portion 84A, taken along a direction perpendicular to the direction line D3, in the direction along the direction line D3 for insertion of the coil wound body 70 where the inner flange portion 84C exists.

The back side referred to herein means a position located at the outer diameter side in the diameter direction, and the front side means a position located at the inner diameter side in the diameter direction, Since the first engagement portion 110 and the second engagement portion 120 have such positional relationship, the coil wound body 70 can be prevented from being detached from the main pole tooth 62, and the attachment state of the coil wound body 70 to the main pole tooth 62 can be maintained. More specifically, when all the coil wound bodies 70 are attached to the main pole teeth 62, the adjacent coil wound bodies 70 are prevented from being detached due to the interference between the acuminate portion 115 and the protruding portion 125 even when the coil wound bodies 70 are being detached from the main pole teeth 62.

However, the effect of preventing the detachment is obtained when the coil wound bodies 70 are attached to all of the main pole teeth 62. More specifically, the main pole tooth 62 has a slight gap to the inner wall surface of the bobbin 80 constituting the insertion hole 85. Therefore, when any one of coil wound bodies 70 is not attached, it is difficult to maintain a positional relationship for preventing detachment of the first engagement portion 110 and the second engagement portion 120. However, when the coil wound bodies 70 is attached to all the main pole teeth 62, the positional relationship for preventing detachment can be realized by the contact (or close proximity) of the engagement portions 110, 120 with each other.

In this case, in the present embodiment, all the bobbins 80 constituting the coil wound bodies 70 attached to the main pole teeth 62 are of the same type. For this reason, the width size of the inner flange portion 84 is set to a specified size, and further, the size in the depth direction of the bobbin 80 (the size along the moving direction when it is attached to the main pole tooth 62) is managed to be a predetermined precision, the positions at the inner diameter side of the engagement portions 110, 120 can be accurately determined, and the contact state between the engagement portions 110, 120 can be achieved relatively easily.

In the state before the coil wound bodies 70 are attached to all the main pole teeth 62 (the state before the coil wound body 70 is not attached to at least one main pole tooth 62), the first engagement portion 110 of any given coil wound body 70 and the second engagement portion 120 of a coil wound body 70 different from the former coil wound body 70 are in a state where there is not latching. In this case, the coil wound body 70 is easily detached from the main pole tooth 62. However, when all the coil wound bodies 70 are attached to the main pole teeth 62, all the sets made of the acuminate portion 115 and the protruding portion 125 are in such a state that they interfere with each other. In FIGS. 5A to 6B, the size L indicates a latch margin of latching, and this portion is a portion where they interfere with each other. As described above, since the size L of the latch margin exists, all the coil wound bodies 70 are prevented from being detached. For example, referring to FIG. 5B, the size L may be a length between a side end portion (e.g., acuminate portion 115) of the first engagement portion 110 of coil wound body 70 and a side end portion SEP of the second engagement portion 120 of the adjacent coil wound body 70 taken along a direction perpendicular to the direction line D1.

By the way, the first engagement portion 110 and the second engagement portion 120 have the following features. First, the first engagement portion 110 is provided with an outer guide unit 116. When the first engagement portion 110 moves along the direction line D1 of FIG. 5A, the outer guide unit 116 overrides the vertex portion 124 of the second engagement portion 120, and is a portion for providing guidance when the first engagement portion 110 overrides the protruding portion 125. In the second engagement portion 120, there also exists an outer guide unit 126 similar to the outer guide unit 116. When the second engagement portion 120 moves along the direction line D1 of FIG. 6A, this outer guide unit 126 is a portion for providing guidance when the second engagement portion 120 overrides the vertex portion 114 of the first engagement portion 110.

With the function for preventing detachment as explained above, the first engagement portion 110 and the second engagement portion 120 according to the present embodiment exerts a snap fit function only after all the coil wound bodies 70 are attached to the main pole teeth 62. In order to exert such a snap fit function, the inner flange portion 84 elastically deforms to such an extent to allow the coil wound body 70 to move along the moving direction after the first engagement portion 110 and the second engagement portion 120 interfere with each other, and accordingly, a feeling caused by the snap fit can be obtained.

5. Regarding Substrate Attachment Unit 130 and Circuit Substrate 150

In the stator 50 explained above, the coil wound body 70 is attached to the stator core 60, and further in the state in which the shaft bearing B2 is attached, for example, over molding is performed to inject resin, so that they are fixed. At this occasion, the shaft bearing B2 is located at the depression fitting portion 141 of the stator module 140.

Figure 8:
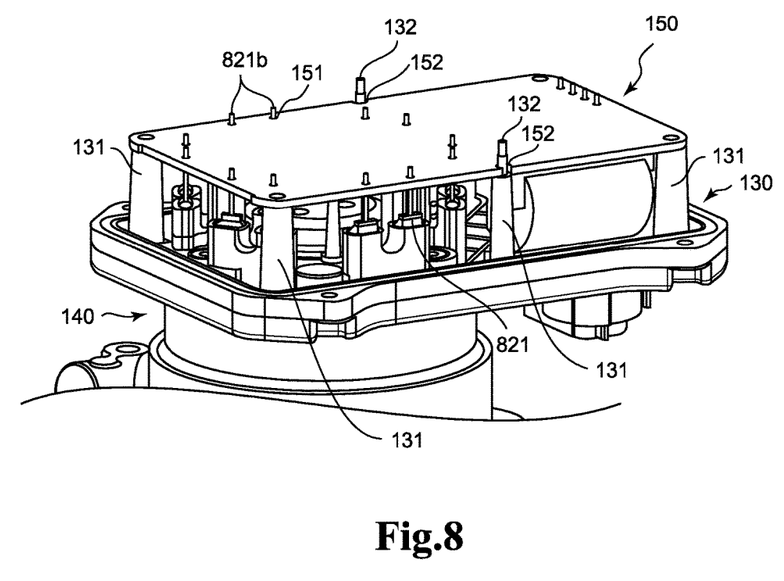
FIG. 8 is a perspective view illustrating a state in which not only the stator of FIG. 1 but also a substrate attachment unit for attaching a circuit substrate is formed by such over molding.

FIG. 8 is a perspective view illustrating a state in which not only the stator 50 but also the substrate attachment unit 130 for attaching the circuit substrate 150 is formed by such over molding. As shown in FIG. 8, the stator 50 and the substrate attachment unit 130 are integrated by over molding. In the following explanation, such an integrated body will be referred to as a stator module 140. The pump main body 21 and the stator module 140 are fixed integrally with screws, for example.

As shown in FIG. 8, the substrate attachment unit 130 has multiple bosses 131 provided in a protruding manner. The distal end side of the protrusion of the boss 131 can receive the circuit substrate 150. The boss 131 is provided with a screw hole, not shown. Therefore, a screw is inserted into the penetration hole of the circuit substrate 150, and the screw is screwed into the boss 131, so that the circuit substrate 150 is attached to the substrate attachment unit 130.

The substrate attachment unit 130 is provided with position determination pins 132. The position determination pin 132 is provided to extend from the boss 131 located at the center side in the longitudinal direction of the substrate attachment unit 130. The position determination pin 132 extends from the side of the stator core 60 in a direction away therefrom. In the present embodiment, a distal end portion of the boss 131 has a larger diameter than the position determination pin 132, and therefore, the boss 131 serves as a receiving unit for receiving the circuit substrate 150. On the other hand, the position determination pin 132 extends sufficiently longer than the pin portion 821*b* of the connection terminal 821 explained above as it extends away from the stator core 60. The extension length of the position determination pin 132 is configured to be longer than a size obtained by adding the thickness of the circuit substrate to the pin portion 821*b*.

As shown in FIG. 8, each of the position determination pins 132 is provided on the outer edge along the longitudinal direction of the circuit substrate 150 (totally a pair of position determination pins 132 are provided). However, the number of position determination pins 132 may be any number.

As shown in FIG. 8, the circuit substrate 150 is provided with pin holes 151 into which pin portions 821*b* of connection terminals 821 are inserted. In the configuration as shown in FIG. 8, six connection terminals 821 are provided, and accordingly, totally twelve pin holes 151 are provided. Around the pin hole 151 explained above, an electrically conductive portion is provided. For this reason, when the pin portion 821*b* is inserted into the pin hole 151, and further, soldering is applied or another component is attached as necessary, the circuit substrate 150 and the connection terminal 821 are connected electrically.

At a substantially central portion in the longitudinal direction of the circuit substrate 150, a position determination depression portion 152 is provided. The position determination depression portion 152 is configured by causing the external peripheral edge portion of the circuit substrate 150 to be depressed toward the center side in the lateral direction of the circuit substrate 150. The position determination pin 132 explained above is inserted into the position determination depression portion 152. Therefore, the position of the circuit substrate 150 with respect to the substrate attachment unit 130 is determined, and this makes it easy to insert the pin portion 821*b* into the pin hole 151. It should be noted that as many position determination depression portions 152 as the number of the position determination pins 132 are provided, but more position determination depression portions 152 may be provided.

As shown in FIG. 1, the cover body 160 is attached to the substrate attachment unit 130. The cover body 160 has a function of arranging the circuit substrate 150 between the cover body 160 and the substrate attachment unit 130 so as to protect the circuit substrate 150. It should be noted that the cover body 160 is preferably made of a material having a high heat dissipation performance such as aluminum and alloys thereof.

6. Advantages

According to the electric motor 30, the pump device 10 using the electric motor 30, and the stator 50 having the above configuration, the inner flange portion 84 of the bobbin 80 is provided with the first engagement portion 110 and the second engagement portion 120. The first engagement portion 110 is located at the outer diameter side in the diameter direction than the second engagement portion 120 of the adjacent coil wound body 70 in the direction line D1 (moving direction) along the main pole tooth 62 of the coil wound body 70 where the first engagement portion 110 exists. The second engagement portion 120 is provided at the outer diameter side in the diameter direction than the first engagement portion 110 of the adjacent coil wound body 70 in the direction line D1 along the main pole tooth 62 of the coil wound body 70 where the second engagement portion 120 exists.

Because of such positional relationship, even if the coil wound body 70 is going to be detached, the coil wound body 70 can be prevented from being detached from the main pole tooth 62 due to the interference between the first engagement portion 110 and the second engagement portion 120, and the attachment state of the coil wound body 70 to the main pole tooth 62 can be maintained.

Therefore, when the stator 50 having the coil wound body 70 attached thereto is set in the mold, and the injection molding is performed, the position of the coil wound body 70 can be prevented from deviating from the stator 50, and this prevents such defect that it cannot be set in the mold or the injection molding cannot be performed. In addition, this prevents the formed stator module 140 from becoming defective. In addition, because of the existence of the protruding portion 125, a snap fit mechanism can be realized, so that a click feeling or an operation sound is generated, which can be used as an indication of completion of assembly.

In the present embodiment, it is not necessary to provide the depression portion as shown in FIG. 9 in the main pole tooth 62. Therefore, the width of the main pole tooth 1 is prevented from being narrowed, and it makes it difficult to cause magnetic saturation due to a narrowed magnetic path. In a case where a protruding portion is provided in the main pole tooth 62, and a depression portion is provided in the bobbin 80, which is a pattern of depression/protrusion opposite to FIG. 9, a thin portion is formed in the bobbin 80, but in the present embodiment, such a thin portion is prevented from being formed, and the bobbin 80 can maintain a high electrical insulation performance.

In the present embodiment, the first engagement portion 110 is provided with the acuminate portion 115 latching the protruding portion 125 at a contact portion for coming into contact with the second engagement portion 120 of the adjacent coil wound body 70. When the acuminate portion 115 engages with the protruding portion 125, this prevents the adjacent engagement portions 110, 120 from slipping from each other. Therefore, this can more reliably prevents the coil wound body 70 from being detached from the main pole tooth 62, and the attachment state of the coil wound body 70 to the main pole tooth 62 can be maintained in a more preferable manner.

Further, in the present embodiment, the second engagement portion 120 is provided with the first tapered portion 121A in parallel with the moving direction of each of the adjacent coil wound bodies 70, and at the other end side in the width direction of the first tapered portion 121A, the protruding portion 125 protruding in a direction away from the first tapered portion 121A is provided. The protruding portion 125 is provided on the second engagement portion 120, so that the shapes of the first engagement portion 110 and the second engagement portion 120 become asymmetrical. The acuminate portion 115 overrides this protruding portion 125, so that the snap fit mechanism can be realized, and a click feeling or an operation sound can be generated. Therefore, when all the coil wound bodies 70 are attached to the main pole tooth 62, a tactile response indicating a correct attachment can be generated.

In the present embodiment, at the end portion side in the width direction of the protruding portion 125, the curved portion 125*a* formed in the curved shape is provided. Therefore, the acuminate portion 115 engages with the curved portion 125*a*, so that the detachment of the coil wound body 70 can be prevented in a favorable manner.

In the present embodiment, all of multiple bobbins 80 are provided in the same shape. Therefore, when the width size of the inner flange portion 84 is set to a specified size, and further, the size in the depth direction of the bobbin 80 (the size along the moving direction when it is attached to the main pole tooth 62) is managed to be a predetermined precision, the positions at the inner diameter side of the engagement portions 110, 120 can be accurately determined, and the contact state between the engagement portions 110, 120 can be achieved relatively easily. Therefore, the snap fit mechanism can be realized easily. As compared with a case where there are bobbins 80 having different (not the same) shapes, the efficiency of production can be improved.

In the present embodiment, the inner flange portion 84 is provided in an elastically deformable manner. For this reason, when the coil wound body 70 is inserted into the main pole tooth 62, the snap fit mechanism can be realized by the elastic deformation of the inner flange portion 84, so that a click feeling or an operation sound can be generated. In such elastic deformation, the size L of the engagement margin exists as shown in FIGS. 5A to 6B, and the detachment of the coil wound body 70 can be prevented in a favorable manner.

In the present embodiment, the first engagement portion 110 and the second engagement portion 120 are provided at the outer side (X1 side, X2 side) than the stator 50 in the axial direction along the rotation axis of the rotor 40 (inner shaft 31). Therefore, the first engagement portion 110 and the second engagement portion 120 are provided at such position that they do not interfere with the stator 50. Accordingly, it is not necessary to change the shape of the stator 50 (the external peripheral ring portion 61, the main pole tooth 62, the commutating pole tooth 63, and the like) when the first engagement portion 110 and the second engagement portion 120 are provided.

Further, in the present embodiment, the first engagement portion 110 and the second engagement portion 120 are provided at a side of coil end which protrudes from an end surface of the stator 50, and are provided inside of a space enclosed by the plurality of coil ends (the space at the inner peripheral side). Therefore, the first engagement portion 110 and the second engagement portion 120 are arranged in the space at the coil end side that is not used in the past, so that the efficiency of utilization the space in the electric motor 30 can be enhanced. Therefore, even when the configuration of providing the first engagement portion 110 and the second engagement portion 120 is employed, the increase in the size of the electric motor 30 and the pump device 10 can be prevented.

Modification

Each embodiment of the present invention has been hereinabove explained, but the present invention can be modified in various manners other than the above. This will be hereinafter explained.

In the embodiment explained above, the pair of the first engagement portion 110 and the second engagement portion 120 are provided at both end portions in the X direction of the bobbin 80 (the upper side and the lower side in FIG. 3). However, the first engagement portion 110 and the second engagement portion 120 may be configured to be provided at only one end portion in the X direction. In this case, for example, a configuration in which the first engagement portion 110 and the second engagement portion 120 are provided only at the X1 side which is a coil end side may also be employed.

In the embodiment explained above, the protruding portion 125 is configured to be provided only in the second engagement portion 120. However, the protruding portion 125 may be configured to be provided not only in the second engagement portion 120 but also in the first engagement portion 110.

In the embodiment explained above, the protruding portion may not be provided on the first engagement portion 110 and the second engagement portion 120. In this case, if all the coil wound bodies 70 are attached, the first engagement portion 110 and the second engagement portion 120 may mutually support one another.

In the embodiment explained above, the bobbin 80 is formed using the resin as the material. However, the bobbin 80 may be made of a material other than the resin if the bobbin 80 elastically deforms to such an extent that the coil wound body 70 is allowed to be further moved in a case where the coil wound body 70 is moved and the first engagement portion 110 and the second engagement portion 120 collide with each other. Examples of such materials include metal, rubber, and the like.

10 . . . pump device
20 . . . pump unit
21 . . . pump main body
22 . . . outer rotor
23 . . . inner rotor
30 . . . electric motor
31 . . . inner shaft (corresponding to rotation axis)
40 . . . rotor
41 . . . yoke
42 . . . magnet
50 . . . stator
60 . . . stator core
62 . . . main pole tooth (corresponding to tooth)
63 . . . commutating pole tooth
70 . . . coil wound body
80 . . . bobbin
82 . . . terminal base portion
84 . . . inner flange portion
90 . . . coil
110 . . . first engagement portion
111 . . . tapered portion
111A, 121A . . . tapered portion (corresponding to parallel tapered portion)
111B, 121B . . . tapered portion
114 . . . vertex portion
115 . . . acuminate portion
116 . . . outer guide unit
120 . . . second engagement portion
121 . . . tapered portion
124 . . . vertex portion
125 . . . protruding portion
125a . . . curved portion
126 . . . outer guide unit
130 . . . substrate attachment unit
131 . . . boss
132 . . . position determination pin
140 . . . stator module
150 . . . circuit substrate
151 . . . pin hole
152 . . . depression portion
821 . . . connection terminal
821b . . . pin portion

The invention claimed is:

1. An electric motor including a rotor having a magnetic pole and a stator for arranging the rotor in a central hole, the electric motor comprising:
a stator core provided on the stator and formed of a magnetic material;
a plurality of teeth provided on the stator core, the plurality of teeth protruding to an inner diameter direction;
at least three coil wound bodies provided to the teeth via an insertion hole, and each of the coil wound bodies having a bobbin and a coil formed by winding a conductive wire around the bobbin;
an inner flange portion provided at the inner diameter side of the each bobbin;
a first engagement portion provided at one end side in a width direction of the each inner flange portion, the first engagement portion being provided with a first tapered portion which is parallel to the moving direction of an adjacent coil wound body along a length extension direction of the tooth, and the first engagement portion being provided with a sliding portion which is parallel to the moving direction of the first engagement portion,
a second engagement portion provided at the other end side in the width direction of the each inner flange portion, the second engagement portion being provided with a second tapered portion which is parallel to the moving direction of an adjacent coil wound body along a length extension direction of the tooth,
an acuminate portion provided at a corner of the first tapered portion and the sliding portion of the first tapered portion, and
a protruding portion provided on the second tapered portion, the protruding portion being protruding more greatly than the other portions of the second tapered portion and including a side end portion which is a vertex of the protruding portion, wherein the acuminate portion of the first engagement portion is provided to be located at an outer diameter side than the side end portion of the second engagement portion of the adjacent coil wound body, the first engagement portion and the second engagement portion are disposed in an equal distance from a rotational axis of the rotor, and all of the bobbins respectively attached to the plurality of teeth are provided in a same shape, and the inner flange portion elastically deforms to a degree that the coil wound body is allowed to move along the moving direction from the inner diameter side, when the acuminate portion collide with the protruding portion of the adjacent coil wound bodies upon moving from the inner diameter side to the outer diameter side.

2. The electric motor according to claim 1, wherein the acuminate portion latches at a contact portion for coming into contact with the second engagement portion of the adjacent coil wound body.

3. The electric motor according to claim 1, wherein a curved portion formed in a curved shape is provided at the end portion side of the width direction of the protruding portion.

4. The electric motor according to claim 1, wherein the first engagement portion and the second engagement portion are provided to protrude from the stator core in an axial direction along a rotation axis of the rotor.

5. The electric motor according to claim 4, wherein the first engagement portion and the second engagement portion are provided at a side of coil end which protrudes from an end surface of the stator, and are provided inside of a space enclosed by the plurality of coil ends.

6. A pump device comprising:
the electric motor according to claim 1; and
a pump unit having a periodic motion unit that makes a periodic motion by an activation of the electric motor, and configured to take and discharge a fluid according to the motion of the periodic motion unit.

7. A stator for an electric motor comprising:
a stator core formed of a magnetic material;
a plurality of teeth provided on the stator core, the plurality of teeth protruding to an inner diameter direction;
at least three coil wound bodies provided to the teeth via an insertion hole, and each of the coil wound bodies having a bobbin and a coil formed by winding a conductive wire around the bobbin;
an inner flange portion provided at an inner diameter side of the each bobbin;
a first engagement portion provided at one end side in a width direction of the each inner flange portion, the first engagement portion being provided with a first tapered portion which is parallel to the moving direction of an adjacent coil wound body along a length extension direction of the tooth, and the first engagement portion being provided with a sliding portion which is parallel to the moving direction of the first engagement portion,
a second engagement portion provided at the other end side in the width direction of the each inner flange portion, the second engagement portion being provided with a second tapered portion which is parallel to the moving direction of an adjacent coil wound body along a length extension direction of the tooth,
an acuminate portion provided at a corner of the first tapered portion and the sliding portion of the first tapered portion, and
a protruding portion provided on the second tapered portion, the protruding portion being protruding more greatly than the other portions of the second tapered portion and including a side end portion which is a vertex of the protruding portion, wherein the acuminate portion of the first engagement portion is provided to be located at an outer diameter side than the side end portion of the second engagement portion of the adjacent coil wound body, the first engagement portion and the second engagement portion are disposed in an equal distance from a rotational axis of the rotor, and all of the bobbins respectively attached to the plurality of teeth are provided in a same shape, and the inner flange portion elastically deforms to a degree that the coil wound body is allowed to move along the moving direction from the inner diameter side, when the acuminate portion collide with the protruding portion of the adjacent coil wound bodies upon moving from the inner diameter side to the outer diameter side.

\* \* \* \* \*